US 6,562,749 B1

(12) United States Patent
Lednor et al.

(10) Patent No.: US 6,562,749 B1
(45) Date of Patent: May 13, 2003

(54) PROCESS FOR THE PREPARATION OF A CATALYST OR CATALYST PRECURSOR

(75) Inventors: Peter William Lednor, Amsterdam (NL); Katherine Searcy-Roberts, Amsterdam (NL)

(73) Assignee: Shell Oil Company, Houston, TX (US)

( * ) Notice: Subject to any disclaimer, the term of this patent is extended or adjusted under 35 U.S.C. 154(b) by 995 days.

(21) Appl. No.: 08/755,844

(22) Filed: Nov. 26, 1996

(30) Foreign Application Priority Data

Nov. 27, 1995 (EP) .............................. 95203262

(51) Int. Cl.$^7$ .......................... B01J 21/00; B01J 29/06; B01J 23/00; B01J 27/055
(52) U.S. Cl. ........................ 502/66; 502/74; 502/201; 502/217; 502/218; 502/221; 502/223; 502/224; 502/229; 502/230; 502/325; 502/326; 502/327; 502/344; 502/347; 502/349; 502/350; 502/353; 502/354
(58) Field of Search ........................... 502/66, 74, 201, 502/217, 218, 221, 223, 224, 229, 230, 243, 246, 247, 258, 259, 260, 261, 262, 300, 325, 326, 327, 344, 347, 349, 350, 353, 354

(56) References Cited

U.S. PATENT DOCUMENTS

| 3,032,599 A | * | 5/1962 | Holm et al. | 502/217 |
|---|---|---|---|---|
| 3,413,337 A | * | 11/1968 | Bost | 502/217 |
| 3,415,737 A | * | 12/1968 | Bost | 502/217 |
| 3,839,192 A | * | 10/1974 | Hayes | 502/223 |
| 4,043,934 A | * | 8/1977 | Shuler et al. | 502/217 |
| 4,076,888 A | | 2/1978 | Perugini et al. | 428/313 |
| 4,520,124 A | | 5/1985 | Abe et al. | |
| 4,645,754 A | * | 2/1987 | Tamura et al. | 502/218 |
| 4,810,685 A | * | 3/1989 | Twigg et al. | 502/60 |
| 5,217,939 A | | 6/1993 | Campbell | 502/339 |
| 5,427,721 A | | 6/1995 | Brezny et al. | 264/44 |
| 5,457,268 A | * | 10/1995 | Greene et al. | 502/66 |
| 5,510,056 A | * | 4/1996 | Jacobs et al. | 252/373 |
| 5,639,401 A | * | 6/1997 | Jacobs et al. | 252/373 |
| 5,658,497 A | | 8/1997 | Kumar et al. | 252/373 |

FOREIGN PATENT DOCUMENTS

| DE | 3433197 | 3/1985 | B01J/35/04 |
|---|---|---|---|
| EP | 198186 | 10/1986 | B01J/37/00 |
| EP | 0567092 A2 | 6/1993 | |
| JP | 63111938 A | 10/1986 | |
| JP | 3111-944 A | 5/1988 | B01J/37/02 |
| WO | 96/16737 | 6/1996 | |

OTHER PUBLICATIONS

International Search Report of Mar. 19, 1997.

* cited by examiner

*Primary Examiner*—Mark L. Bell
*Assistant Examiner*—Patricia L Hailey

(57) ABSTRACT

A process for the preparation of a ceramic foam supporting one or more catalytically active components or precursors thereof, which component is active in a form other than an inorganic oxide, the process comprising impregnation of the foam with an impregnating phase comprising the catalytically active component or a precursor thereof and drying, wherein the impregnating phase has a viscosity greater than 1 cps, wherein drying is performed without substantial prior draining of impregnating phase from the ceramic foam, and wherein the catalytically active component or precursor thereof is present throughout the process in one or more forms other than the inorganic oxide thereof. The ceramic foams prepared by this process find use in catalytic conversion processes, in particular the catalytic partial oxidation of a hydrocarbon feed.

6 Claims, No Drawings

PROCESS FOR THE PREPARATION OF A CATALYST OR CATALYST PRECURSOR

The present invention relates to a process for the preparation of ceramic foams supporting one or more catalytically active components and/or precursors thereof, and catalytic applications thereof, in particular the preparation of ceramic foams supporting catalytically active components, or precursors thereof for use in gas treating and as catalysts in catalytic conversion reactions, particularly in the preparation of carbon monoxide and hydrogen by the partial oxidation of a hydrocarbon feed, in nitric oxides reduction processes, in ethylene oxidation, and the like.

Ceramic foams are known for various applications, in particular more recently as supports for catalytically active materials fulfilling several requirements simultaneously, as described in "Preparation and properties of ceramic foam catalyst supports" by M V Twigg and J T Richardson published in the "Scientific Bases for the preparation of heterogeneous catalysts" 6th International Symposium Sep. 5–8, 1994 Louvain-la-Neuve, Belgium. Open pore ceramic foams and the more traditional extrudates may be made from materials with high temperature resistance, and promote surface-catalyzed reaction by means of tortuous flow patterns, in foams by virtue of connecting adjacent pores or "cells" providing non-linear channels, and in extrudate beds by virtue of random particle packing. Ceramic foams enable the passage of gases at high space velocities and acceptable pressure drop, are readily shaped and provide good conductivity.

EP 0 260 826 discloses ceramic foam supports suited for use in steam reforming of methane, comprising a network of irregular passages extending therethrough, comprising supported catalytically active material and an inorganic oxide stabilizer to prevent sintering of the active material. The stabilizer and the active material are introduced by impregnation of the foam by means of immersion of the foam in an aqueous solution of a salt of the stabilizer and the active component, draining to remove excess solution and firing at 450° C. This process is repeated to build up sufficient impregnant layer on the foam. The foams described are to be used at relatively low temperatures, of the order of 760° C.

FR 2 590 887 discloses zirconium oxides having stable surface area at elevated temperatures, the oxide comprising as additive an oxide of silicon, the rare earths, yttrium, cerium and/or aluminum. The additive may be introduced by various means including coprecipitation, mixing of salt with sol hydrate and impregnation of the zirconium oxide with a salt precursor of the additive. Impregnation is preferably performed "dry" whereby the total volume of the impregnating solution is approximately equal to the total pore volume of the (oxide) support. It is taught by means of example to impregnate extruded support granules with the aqueous impregnating solution, to dry at 160° C. for 16 hours and calcine at 400° C. There is no reference to supports in the form of foam structures, which comprise pores of one or more orders of magnitude greater than the mesoporous, and for which a different mechanism of supporting of the additive is involved.

The provision of ceramic foams having significant loadings of inorganic oxides remains a problem, even more so in applications employing extreme conditions typical of some processes, for which improved surface area retention is needed compared with known foam supports. It has now surprisingly been found that the limitation on inorganic oxide loading and on surface area lies not with the concept of providing an additional layer, as is known from the referred publications, but in the manner of its provision, whereby full advantage is not obtained. European Patent Application No. 94 203453.9 is directed to the surprising finding that in a particular process for the preparation of ceramic foams supporting inorganic oxide(s) a significant increase in inorganic oxide loading and in surface area can be attained, which increase is still favorable at temperatures at or above 800° C. The process disclosed in European Patent Application No. 94 203453.9 comprises impregnating the foam with an impregnating phase comprising the inorganic oxide(s) in an impregnating phase and drying wherein the impregnating phase has a viscosity greater than 1 cps, i.e. greater than water, and drying is performed without substantial prior draining of impregnating phase from the ceramic foam.

Surprisingly, it has now been found that the process described in European Patent Application No. 94 203453.9 for preparing ceramic foams supporting one or more inorganic oxides may also be applied in the preparation of ceramic foams supporting one or more catalytically active components which are wholly or partly active in forms other than an inorganic oxide.

Accordingly, the present invention provides a process for the preparation of a ceramic foam supporting one or more catalytically active components or precursors thereof, which component is active in a form other than an inorganic oxide, the process comprising impregnation of the foam with an impregnating phase comprising the catalytically active component or a precursor thereof and drying, wherein the impregnating phase has a viscosity greater than 1 cps at 20° C., wherein drying is performed without substantial prior draining of impregnating phase from the ceramic foam, and wherein the catalytically active component or precursor thereof is present throughout the process in one or more forms other than the inorganic oxide thereof.

It is a particular feature of the invention that the use of an impregnating phase more viscous than water allows significant retention of the impregnating phase in the foam pores prior to and during drying. This is a problem not encountered in the impregnation of other materials having pore sizes orders of magnitude less than typically found in ceramic foams.

Suitably the impregnating phase has a viscosity of greater than 1 cps, preferably 1 cps at 20° C., preferably of from 5 to 80 cps, more preferably from 7 to 50 cps. A suitable viscosity may be selected according to the properties of the ceramic foam, in particular the pore size thereof, whereby a smaller pore size would require a less viscous impregnating phase. The impregnation is suitably carried out at a temperature between 0 and 90° C., especially 10 to 50° C., more especially at 20° C.

Suitably the drying is performed without substantial prior draining of impregnating phase from the ceramic foam. Reference herein to "substantial prior draining" is to draining practices common in the art of washcoating and impregnation, and which may involve subjecting the foam to vacuum, centrifuging or blowing air through the foam for example. It is intended that substantially none of the impregnating phase introduced into the foam pores should be deliberately removed but rather should be allowed to be-retained, aided by the viscosity thereof. Suitably, therefore, any drainage of impregnating phase from the pores prior to drying is less than 60%, preferably less than 50%, more preferably from 0% to 40%, still more preferably 0% to 20% of that introduced. Preferably the pores of the foam are substantially filled with impregnating phase prior to drying. Preferably the foam pores are filled by at least 60% with impregnating phase, more preferably by at least 85%. Suitably the ceramic foam is immersed slowly or incrementally into the impregnating phase whereby formation of air pockets is prevented, this enabling filling of the pores. The rate of immersion or extent of initial immersion may be determined appropriately according to the pore size (ppi) of the foam, and the viscosity of the impregnating phase. The impregnation may be carried out at or below atmospheric pressure. With use of foams of small pore diameters it may be particularly advantageous to impregnate at reduced pressure of between 0.5 and 1 atmosphere. The pore volume may be calculated for example on the basis of the density, weight and dimensions of the foam, whereby the amount of impregnating phase required may be determined.

There is, however, provided in a further aspect of the invention the option to deliberately allow the displacement of the impregnating phase and/or the catalytically active component or precursor to occur and thereby allow a gradient of impregnant to develop. This has the advantage of providing a gradient in solids loading which may not be obtained by alternative means. This may be achieved for example by selection of a slightly less viscous impregnating phase than would otherwise be appropriate for a given foam sample. Reference herein to a "gradient" in any given property of the foam samples of the invention is to a stepwise or continuous change in value of that property, such as solids loading for example, across a given dimension of the impregnated foam sample.

The ceramic foam is used as a support for one or more catalytically active components. In this respect, the term "catalytically active component" is a reference to such components in the broadest sense, that is including components which exhibit catalytic activity per se, together with other components which, acting as promoters, stabilizers and the like, have a beneficial effect on the catalytic performance of the components present.

The catalytically active component to be supported on the ceramic foam may be selected from any suitable component or combination of components known in the art. Suitable catalytically active components include the elements in Groups IA, IIA, IIIA, and IVA of the Periodic Table of the Elements and the transition metals. Preferred catalytically active components are the elements selected from Groups IA, IB, IIA, IIB, IIIA, IIIB, IVB, VB, VIB, VIIB, and VIII and the lanthanides. References herein to the Periodic Table of the Elements are to the CAS version, as published in the CRC Handbook of Chemistry and Physics, 68th Edition. Preferred elements include lithium, sodium, potassium, rubidium, caesium, beryllium, magnesium, calcium, strontium, barium, scandium, yttrium, lanthanum, cerium, titanium, zirconium, hafnium, vanadium, niobium, tantalum, chromium, molybdenum, manganese; iron, ruthenium, osmium, cobalt, rhodium, iridium, nickel, palladium, platinum, copper, silver, gold, zinc, cadmium, mercury, aluminum, gallium, silicon, germanium, tin, and lead. The selection of catalytically active components or combination of components will depend upon the intended end use of the finished ceramic foam.

One purpose for which the ceramic foams prepared by the process of the present invention are particularly suitable is the catalytic partial oxidation of a hydrocarbon feed. Suitable catalytically active components for the catalytic partial oxidation process are the Group VIII elements; cobalt, iron, nickel, ruthenium, rhodium, palladium, osmium, iridium and platinum. Preferred elements for the catalytic partial oxidation process are ruthenium, rhodium and iridium. A further application of the ceramic foams is in a process for the reduction of nitric oxides. Suitable catalytically active components for the reduction of nitric oxides include vanadium, titanium, and a mixture thereof. Ceramic foams prepared by the process of this invention are also suitable for use in the manufacture of ethylene oxide. A most suitable catalytically active component for this application is silver.

The catalytically active components may be provided on the ceramic foam directly as the element or in the form of a precursor thereof. Suitable precursors are salts and complexes of the catalytically active component. The precursors may be organic or inorganic compounds, with inorganic compound being preferred. Generally, if a precursor of the catalytically active component is being employed, it is preferred that the precursor does not contain elements or components which will impair the performance of the ceramic foam in its intended end use. Alternatively, precursors may be selected which contain elements which can be removed by further processing of the ceramic foam, for example further processing of the ceramic foam, for example calcining, prior to the use of the foam. Suitable inorganic precursors for the catalytically active components include halides, in particular chlorides, bromides and iodides, nitrates, sulphates, phosphates. Suitable organic precursors include carbonyls, acetates, acetyl acetonates and oxalates.

The ceramic foam is impregnated with the catalytically active component or the precursor thereof by means of an impregnating phase. The impregnating phase may be in the form of any suitable liquid having viscosity greater than that of water. Suitably the impregnating phase is in the form of an aqueous or organic solution, slurry, sol, gel, suspension or dispersion. The preparation of such an impregnating phase is well known in the art.

If the impregnating phase comprises the catalytically active component or precursor in the form of a solid, for example as a slurry or a suspension, any suitable solid content may be employed. Preferably the impregnating phase employed in such cases has a solid content of greater than 0.01 wt % whereby a sufficient amount of catalytically active component or precursor is introduced into the pores. Preferably the solids content is between 0.01 and 20 wt %, the maximum solids loading depending on the loading at which the particle dispersion deteriorates, or flocculation occurs.

The catalytically active component or combination thereof may be present in the finished product in any suitable amount required to perform the desired function. Typically the catalytically active component will be present in an amount of greater than 0.01 wt % of the weight of ceramic foam, more preferably from 0.01 to 20 wt %.

The foam may be pre-treated prior to impregnation, in order to improve the dispersion and cohesion of the eventual catalytically active component. A pre-treatment of the foam with water and drying to give an optimized concentration of surface hydroxide groups, for example, prior to impregnation with the impregnating phase has been found to give improved impregnation of the foams.

After impregnation, the ceramic foam is dried. As noted hereinbefore, it is an essential part of the process of the present invention that drying is effected without substantial prior draining of impregnating phase from the ceramic foam. Drying may be performed by any known means, such as subjecting to air-flow at ambient temperature, oven drying or microwave drying. Any undesired displacement of impregnating phase during drying may conveniently be avoided by rotation of the foam, or other suitable means.

The conditions under which the ceramic foam is dried will depend largely upon the particular impregnating phase employed. Typically, drying is conducted at temperatures in the range of from ambient temperature to 100° C.

After drying, the ceramic foam may be calcined, if desired. Calcination may be performed by heating the ceramic foam to a temperature in the range of from 100 to 1200° C. Typical calcination procedures last from 2 to 8 hours. In order to avoid the formation of oxide forms of the catalytically active components, calcination, if conducted, should be performed in an inert or reducing atmosphere. Calcination procedures of this nature are well known in the art.

The ceramic foam may be impregnated with more than one catalytically active component or precursor thereof simultaneously or sequentially. If sequential impregnation is to be employed, it may be advantageous to complete the procedure of impregnation, drying and calcination for each component before proceeding with the impregnation of the next component. Similarly, if several impregnations of the ceramic foam are desired in order to achieve a higher loading of the catalytically active component or precursor, it may be preferred to follow each impregnation stage with a drying and calcination stage.

Suitable ceramic foams to be employed in the present invention are for example those having 5, more suitably 10, or more pores per inch. Commercially available foams are generally in the range of up to 200 pores per inch. Preferably the foams are in the range of 10 to 60 ppi, more preferably 15 to 40 ppi. The choice of foam will generally depend on the intended use, whereby selection of material from high temperature stable single or mixed refractory oxides of silica, alumina, titania, zirconia and (partially) stabilized forms thereof, carbides, nitrides and mixtures thereof may confer beneficial properties such s thermal stability, thermal shock resistance and/or strength, and whereby increase in pores per inch rating generally corresponds to an increase in tortuosity of a fluid passed through the foam. In specific applications, for example where pore surface contact of a fluid passing at high space velocities through the foam is desired, there is a need for a high tortuosity foam. The term "tortuosity" is a common term which, when referring to a fixed catalyst bed, can be defined as the ratio of the length of the path taken by a gas flowing through the bed to the length of the shortest straight line path through the bed. Thus a non-tortuous bed, such as a honeycomb monolith structure, has a tortuosity of 1.0. Suitably, ceramic foams of the present invention have a tortuosity of at least 1.1, for example of 1.1 to 10.0, more preferably of 1.1 to 1.0, most preferably of 1.3 to 4.0.

If is a particular advantage of the present invention that the process is substantially independent of the size, shape, or other dimension of foam sample being impregnated. Suitably foams of any dimensions or scale may be impregnated and yield excellent results, for example foams of the order of centimeters to order of meters, preferably of dimension in any given direction of 0.5 cm to 1 m.

In a further aspect the present invention provides the use of ceramic foams obtained as above defined as a catalyst in a catalytic conversion process. Particular advantages are obtained with the use of ceramic foams obtained as above defined as a catalyst in a conversion process employing temperatures greater than or equal to 800° C., preferably employing space velocities greater than or equal to 500,000 Nl/kg/hr, more preferably in a process for the preparation of carbon monoxide and hydrogen by the partial oxidation of a hydrocarbon feed.

In a further aspect, the present invention provides a process for the partial oxidation of a hydrocarbon feed, the process comprising contacting the hydrocarbon feed and an oxygen-containing gas with a catalyst comprising as catalytically active component an element from Group VIII of the Periodic Table, which catalyst is in the form of a ceramic foam prepared by a process as hereinbefore described.

The invention is now illustrated by means of nonlimiting examples.

EXAMPLE

Rectangular samples (approximately 4×4×1 cm) of magnesium PSZ foam (Hitech Ceramics) with 20 pores per inch were modified by impregnation with an aqueous rhodium chloride solution (3.05 g $RhCl_3$ in 21.45 ml, viscosity less than 1 cps at 20° C.), and by impregnating foam with the same rhodium solution, but containing hydroxy ethyl cellulose (0.5 g; viscosity between 50 and 150 cps at 20° C., FLUKA 54290 med viscosity). The impregnation of the foam was effected by immersing the foam in the aqueous solution, followed by application of vacuum (0.8 bar) for 1.5 hours. The samples were transferred to a drying oven with substantially no loss of impregnating medium from the pores and were then dried at 120° C. for 4 hours. After drying the samples were calcined at 700° C. for 4 hours. The foams were weighed before modification and after drying and calcination. The example in which the low viscosity impregnation sol was used resulted in a calcined foam containing 1.1 wt percent Rh (calculation based on assumption that rhodium is present as $Rh_2O_3$), the example in which the high viscosity impregnation sol was used resulted in a calcined foam containing 5.6 wt percent Rh. In both samples the rhodium is present mainly in the form of rhodium metal.

We claim:

1. A process for the preparation of a ceramic foam support supporting at least one catalytically active component or precursor thereof, which component is active in a form other than an inorganic oxide, the process comprising impregnation of the ceramic foam containing pores with an impregnating phase comprising the catalytically active component or a precursor thereof and drying, wherein the impregnating phase has a viscosity, of from 5 to 80 cps, wherein drying is performed without substantial prior draining of impregnating phase from the ceramic foam, and wherein the catalytically active component or precursor thereof is present throughout the preparation process in one or more forms other than the inorganic oxide thereof.

2. The process of claim 1 wherein the drainage of the impregnating phase from the foam prior to drying is 0 to 40% of that introduced.

3. The process of claim 1 wherein the pores of the foam are filled by at least 60% with impregnating phase.

4. The process of claim 1 wherein catalytically active component is selected from the group consisting of cobalt, iron, nickel, ruthenium, rhodium, palladium, osmium, iridium, platinum, vanadium, titanium, silver, and a mixture thereof.

5. The process of claim 4 wherein precursor for the catalytically active component is employed and is selected from chlorides, bromides, iodides, nitrates, sulphates and phosphates.

6. The process of claim 1 wherein the ceramic foam has a tortuosity in the range of from 1.1 to 5.0.

* * * * *